(12) United States Patent
Lane et al.

(10) Patent No.: US 6,608,686 B1
(45) Date of Patent: Aug. 19, 2003

(54) MEASUREMENT OF METAL ELECTROPLATING AND SEED LAYER THICKNESS AND PROFILE

(75) Inventors: Lawrence Lane, San Jose, CA (US); Nickhil Jakatdar, Los Altos, CA (US); Xinhui Niu, Los Altos, CA (US)

(73) Assignee: Timbre Technologies, Inc., Santa Clara, CA (US)

( * ) Notice: Subject to any disclaimer, the term of this patent is extended or adjusted under 35 U.S.C. 154(b) by 0 days.

(21) Appl. No.: 10/022,035

(22) Filed: Dec. 13, 2001

(51) Int. Cl.$^7$ .............................................. G01B 11/00
(52) U.S. Cl. ................................... 356/601; 356/237.5
(58) Field of Search ................................ 356/601, 625, 356/630, 636, 503, 237.4–237.5; 438/16–17, 625, 627–629, 643, 653–656; 250/559.28, 559.16; 451/28, 41, 288

(56) References Cited

U.S. PATENT DOCUMENTS

| | | | | |
|---|---|---|---|---|
| 5,075,559 A | * | 12/1991 | Amir | 356/630 |
| 5,835,226 A | * | 11/1998 | Berman et al. | 356/630 |
| 5,982,496 A | * | 11/1999 | Ziger | 356/630 |
| 6,140,228 A | * | 10/2000 | Shan et al. | 438/653 |
| 6,166,819 A | * | 12/2000 | Schnabel | 356/504 |
| 6,229,610 B1 | * | 5/2001 | Meeks et al. | 356/630 |
| 6,303,401 B2 | * | 10/2001 | Nichterwitz et al. | 438/17 |
| 6,352,467 B1 | * | 3/2002 | Somekh et al. | 451/28 |
| 6,368,954 B1 | * | 4/2002 | Lopatin et al. | 438/627 |
| 6,413,858 B1 | * | 7/2002 | Chopra | 438/643 |

\* cited by examiner

Primary Examiner—Frank G. Font
Assistant Examiner—Sang H. Nguyen
(74) Attorney, Agent, or Firm—Morrison & Foerster LLP

(57) ABSTRACT

A method and system for measuring metal electroplating barrier and seed layer thickness and profile. Using optical metrology, profiles of post-barrier deposition grating and post-seed deposition grating can be measured non-destructively. In turn, the thickness and profile of the barrier layer can be determined by subtracting the profile of the post-barrier deposition grating from the profile of the substrate damascene grating. Similarly, the thickness and profile of the seed layer can be determined by subtracting the profile of the post-seed deposition gratin from the profile of the post-barrier deposition grating.

29 Claims, 9 Drawing Sheets

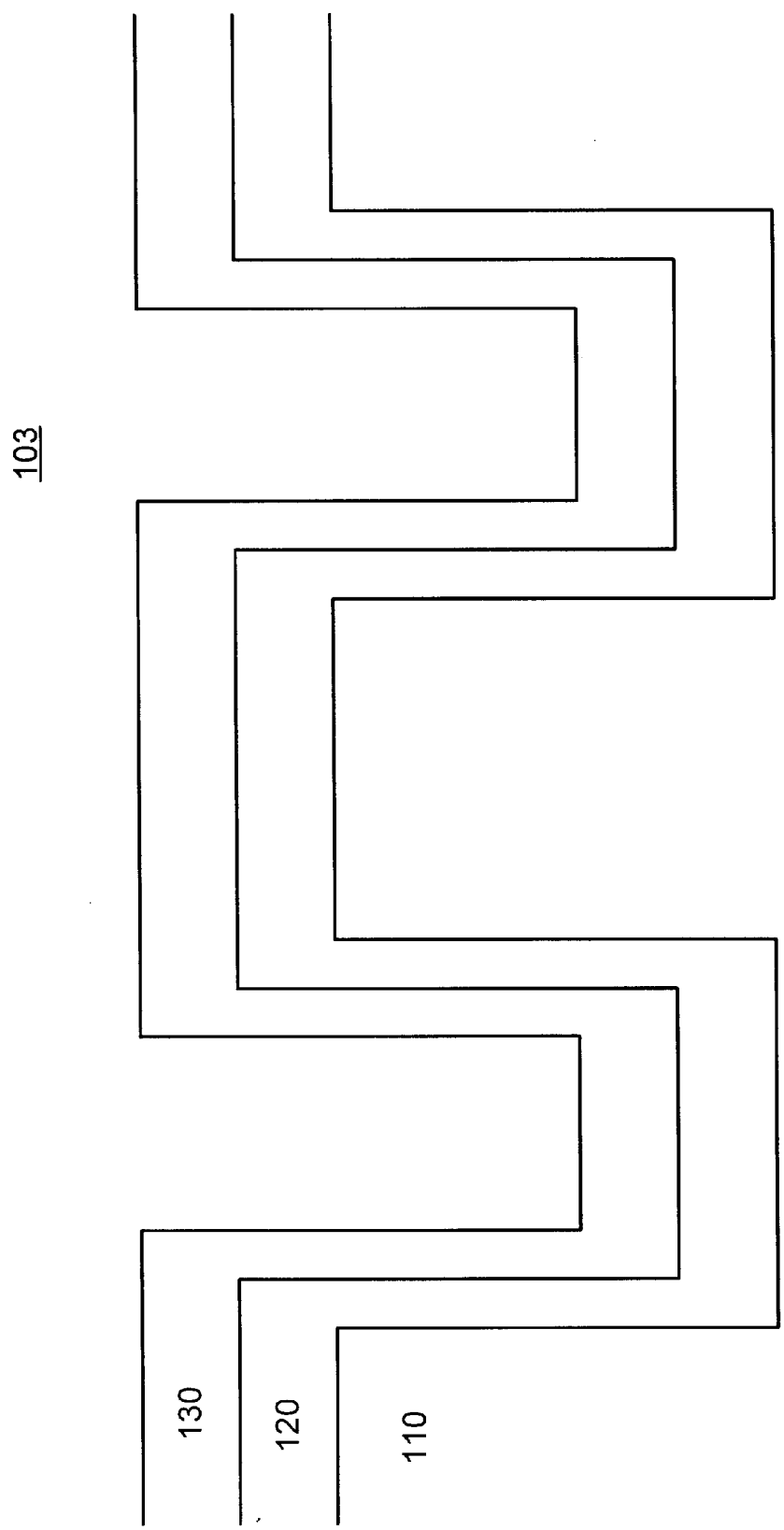

MEASUREMENT OF METAL ELECTROPLATING AND SEED LAYER THICKNESS AND PROFILE

FIELD OF THE INVENTION

The present invention relates to measuring the thickness and profiles of metal layers in an integrated circuit. A key application is the measurement of metal electroplating barrier and seed layers.

BACKGROUND

One of the key metrology problems for thin metal layers is the measurement of metal thickness and profile in the actual line or contact (or via). Many times, measurements are made in a field or flat area away from the actual area of the line. These measurements do not necessarily give an accurate estimation of the film thickness or profile within the actual line area. One particular case involves copper metallization. For copper metallization it is necessary to measure the barrier, typically tantalum (Ta) or tantalum nitride (TaN), and seed layers (typically Cu) which are deposited before copper electroplating. These layers are deposited on patterned (often called Damascene) structures. Due to typical non-conformality of processes used to deposit these layers (typically physical vapor deposition or PVD), the thickness of these films on the surface is very different (much thicker) from the thickness on the sidewall and bottom of the trench or via. Thickness of the barrier is typically around 20–40 nm on the surface and only 5–10 nm on the sidewall. Copper seed thickness is 50–150 nm on the surface and 10–25 nm on the sidewall.

The sidewall thickness is critical for two reasons. First, the side wall thickness determines the integrity of the barrier layer, which must be thick enough to prevent metal diffusion. Second, in order for electroplating to completely fill a structure, the seed layer needs to be continuous. If the seed metal layer is too thin on the sidewall, filling will be incomplete, resulting in voids. Other problems can be caused when the seed layer is thicker at the top of a damascene structure than at the bottom. This can result in pinch-of of the filling during plating, again resulting in voids.

After metal electroplating is used to fill the entire damascene structure, all metal is removed from the wafer surface. This means that what is currently being measured on the field area is not really relevant. IC manufacturers are interested in the thickness of these materials on the sidewall, but can only measure the material on the surface non-destructively. Currently, in order to measure the material on the sidewalls, it is necessary to do cross-sectional scanning electron microscopes (SEM's) or transmission electron microscope (TEM's), thereby necessitating "breaking the wafer."

BRIEF DESCRIPTION OF THE FIGURES

The accompanying drawings which are incorporated in and form a part of this specification, illustrate embodiments of the invention and together with the description, serve to explain the principles of the invention:

FIG. 1C shows a structural profile of a post-seed deposition damascene grating having a seed layer added on the barrier layer in accordance with the present embodiment.

DETAILED DESCRIPTION

Reference is made in detail to the exemplary embodiments of the invention. While the invention is described in conjunction with the exemplary embodiments, the invention is not intended to be limited by these exemplary embodiments. On the contrary, the invention is intended to cover alternatives, modifications and equivalents, which may be included within the spirit and scope of the invention as defined by the appended claims. Furthermore, in the following detailed description of the invention, numerous specific details are set forth in order to provide a thorough understanding of the invention. However, as is obvious to one ordinarily skilled in the art, the invention may be practiced without these specific details. In other instances, well-known methods, procedures, components, and circuits have not been described in detail so that aspects of the invention will not be obscured.

FIGS. 1A–D show a sequence of damascene grating structural profiles for electroplating metal during an IC process flow. FIGS. 1A–D are provided as references for discussing various methods of measuring the thickness and profiles of metal layers for metal electroplating.

Figure 1A:
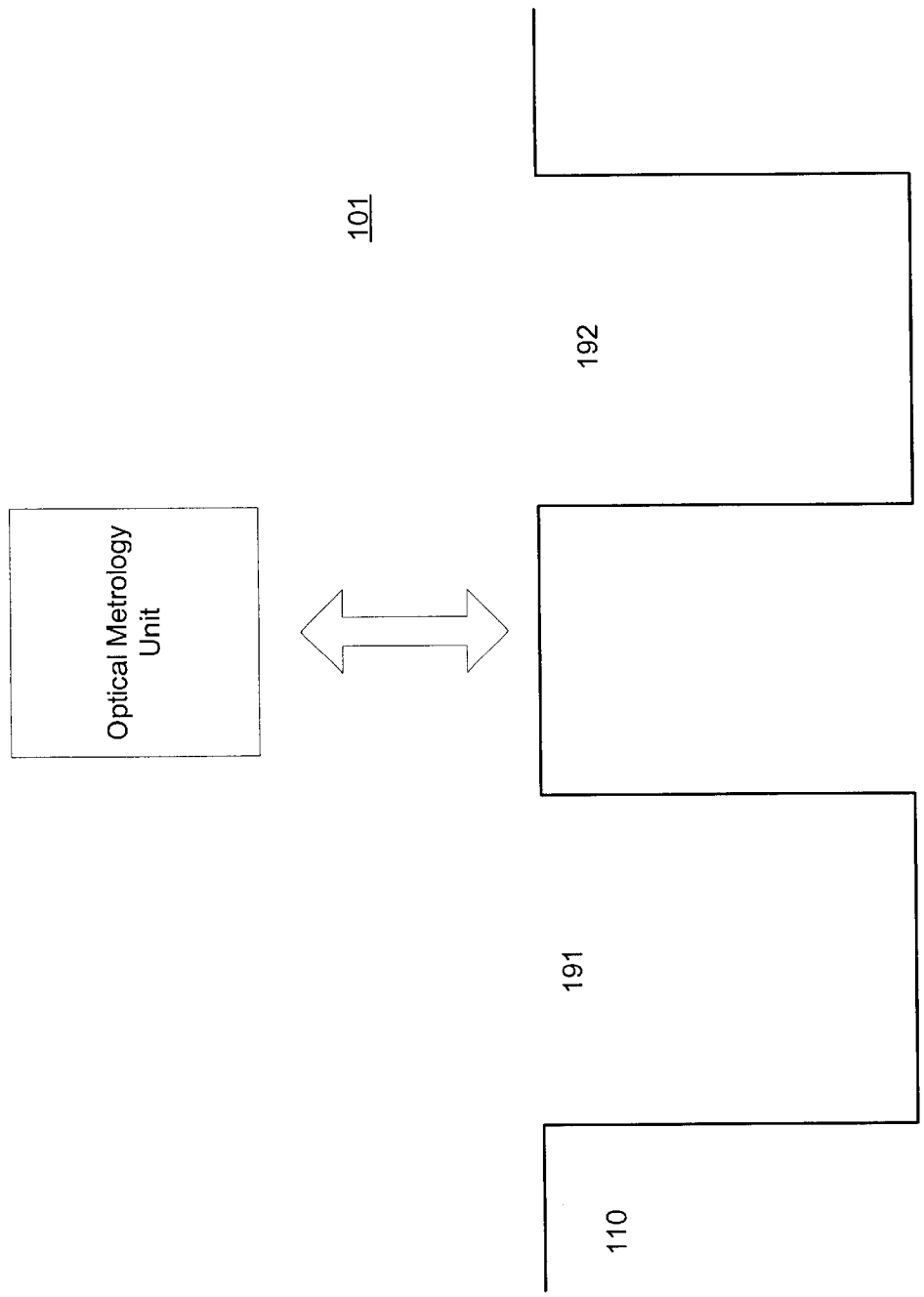
FIG. 1A shows a structural profile of a dielectric substrate as a Damascene grating in accordance with one embodiment of the invention.

Referring now to FIG. 1A, a structural profile 101 of a dielectric substrate 110 as a damascene grating is shown having two trenches 191 and 192 in accordance with one embodiment of the invention. Dielectric substrate 110 can be referred to as a pre-metal deposition damascene grating, or a pre-barrier deposition damascene grating.

Figure 1B:
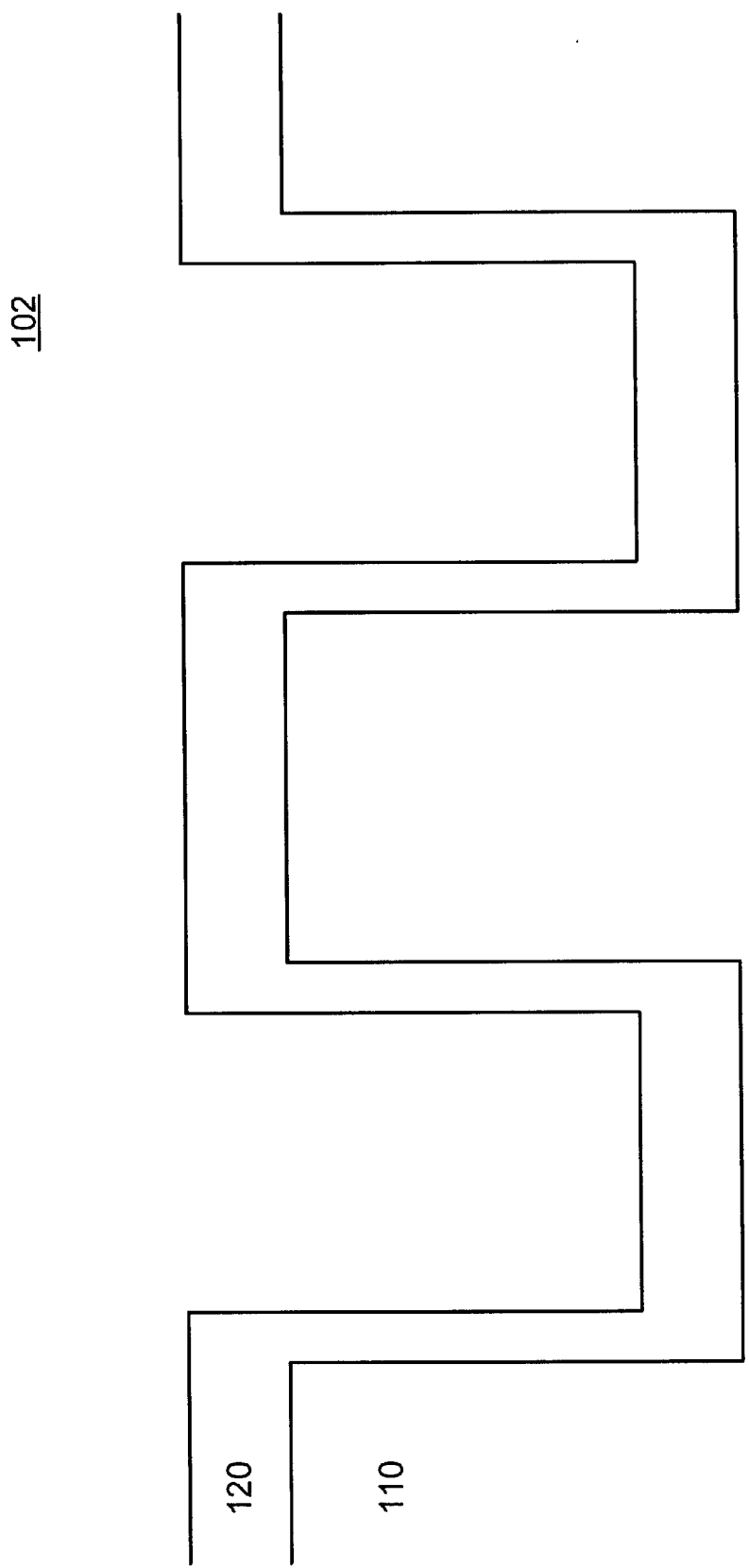
FIG. 1B shows a structural profile of a post-barrier deposition damascene grating having a barrier layer added on the dielectric substrate in accordance with the present embodiment.

Referring now to FIG. 1B, a structural profile 102 of a damascene grating is shown having a barrier layer 120, (typically Ta or TaN), added on dielectric substrate 110 in accordance with one embodiment of the invention. The resulting damascene structure can be referred to as a post-barrier deposition damascene grating.

Referring now to FIG. 1C, a structural profile 103 of a damascene grating is shown having a seed layer 130 (typically Cu) added on barrier layer 120 in accordance with one embodiment of the invention. The resulting damascene structure can be referred to as a post-seed deposition damascene grating, or a post-metal deposition damascene grating.

Figure 1D:
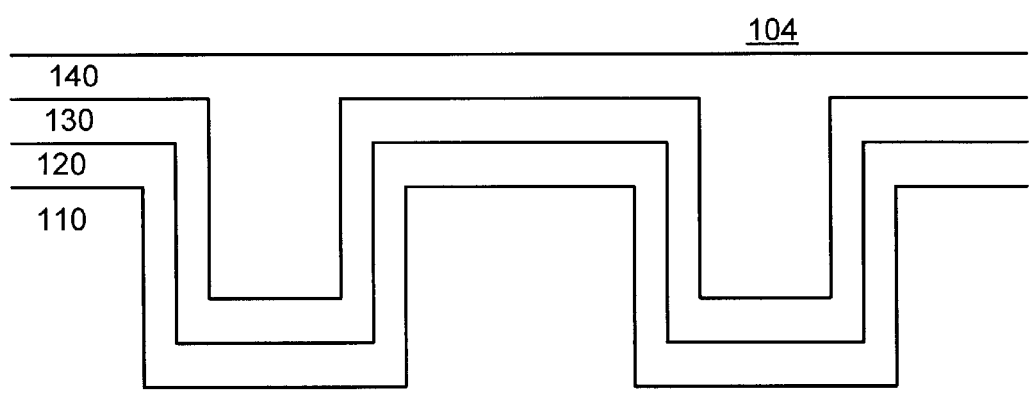
FIG. 1D shows a structural profile of a damascene grating having a metal layer electroplated on seed layer in accordance with the present invention.

Referring now to FIG. 1D, a structural profile 104 of a damascene grating is shown having a metal layer 140 electroplated on seed layer 130 in accordance with one embodiment of the invention.

Figure 1E:
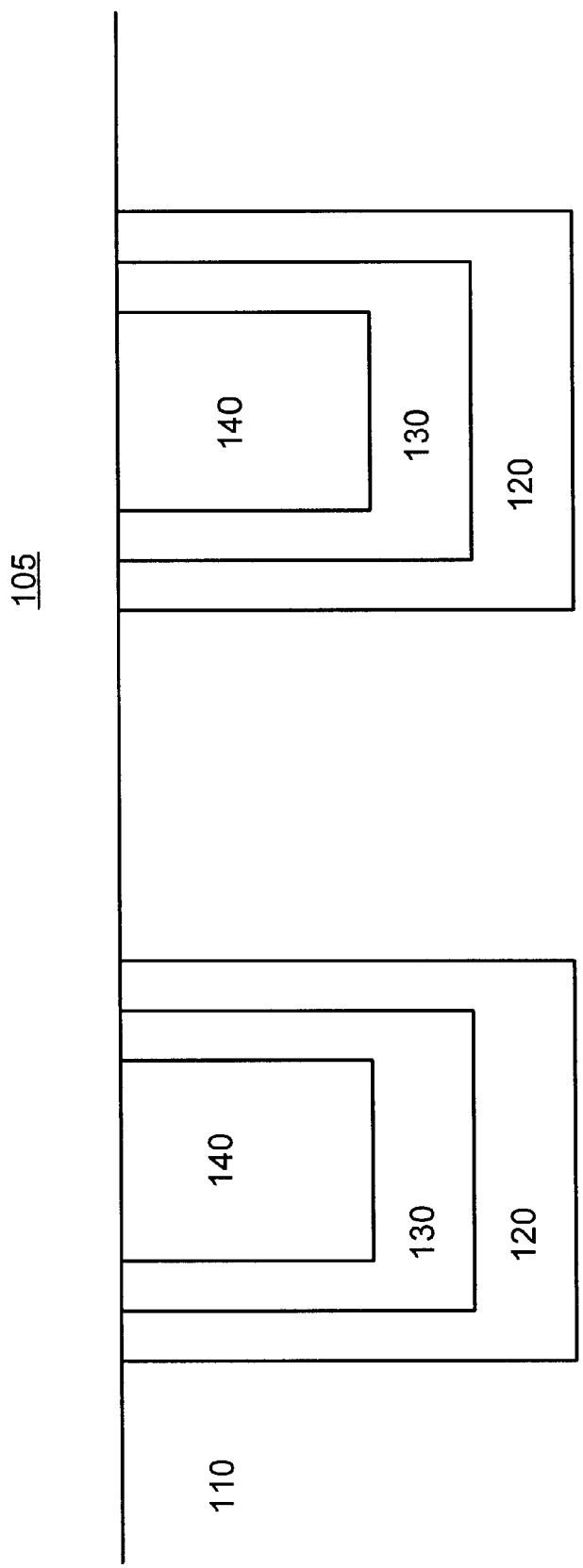
FIG. 1E shows a structural profile 105 of a metal electroplated damascene grating having chemical mechanical polishing (CMP) performed on the metal layer in accordance with the present embodiment.

Referring now to FIG. 1E, a structural profile 105 of a damascene grating is shown having CMP performed on metal layer 140 in accordance with one embodiment of the invention. Barrier layer 120, seed layer 130 and electroplated metal layer 140 are removed from the field side.

In the description of FIGS. 2–5 to follow, optical metrology is referenced throughout. Optical metrology can be used to provide the profile of the metal layers (the barrier layer and the seed layer) in the damascene structures. The barrier layer can be transparent in the thickness of interest; thus, optical metrology can be used to measure the barrier layer. On the other hand, since the seed layer will typically not be transparent in the thickness range of interest, it is necessary to do a subtractive measurement. Optical metrology, and more specifically optical digital profiling (ODP), which is an example of optical metrology, is discussed more fully in co-pending U.S. patent application Ser. No. 09/727,530 entitled "System and Method for Real-Time Library Generation of Grating Profiles" by Jakatdar, et al., filed on Nov. 28, 2000, and is incorporated in its entirety herein by reference.

Figure 2:
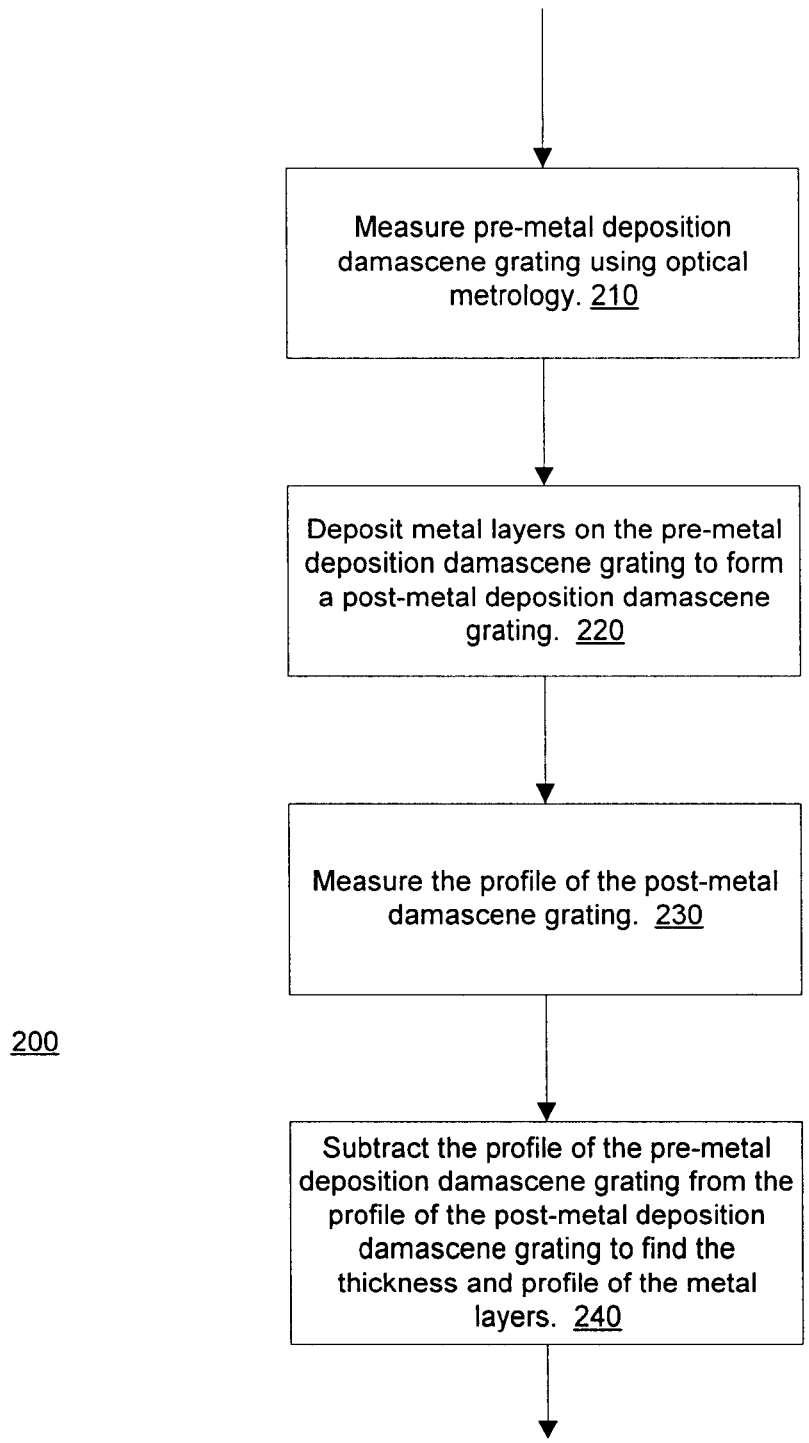
FIG. 2 is a flow chart shown outlining steps for determining the total thickness and profile of the barrier and seed metal layers for electroplating metal in accordance with one embodiment of the invention.

Referring now to FIG. 2, a flow chart 200 is shown outlining steps for determining the total thickness and profile of metal layers for electroplating metal in accordance with one embodiment of the invention.

Specifically, in step 210, a pre-metal deposition damascene grating is measured using optical metrology before the metal layers are deposited. Based on this measurement, the CD (critical dimension) and profile of this pre-metal deposition damascene-grating is determined.

In step 220, metal layers (barrier and seed layers) are deposited on the pre-metal deposition damascene grating, thereby resulting in a post-metal deposition damascene grating. If this is done using the typical sequence, the barrier and seed layers will be deposited in the same system.

In step 230, the profile of the post-metal deposition damascene grating is measured (with both metal layers deposited) using optical metrology.

In step 240, the total metal thickness and profile of the metal layers are determined by subtracting the profile of the pre-metal deposition damascene grating from profile of the post-metal deposition damascene grating.

Sometimes, it may be desirable to measure the barrier layer or the seed layer individually. In this case, different sequences of processing steps would be used. As such, FIGS. 3 and 4 provide two methods of measuring the barrier layer and the seed layer separately.

Figure 3:
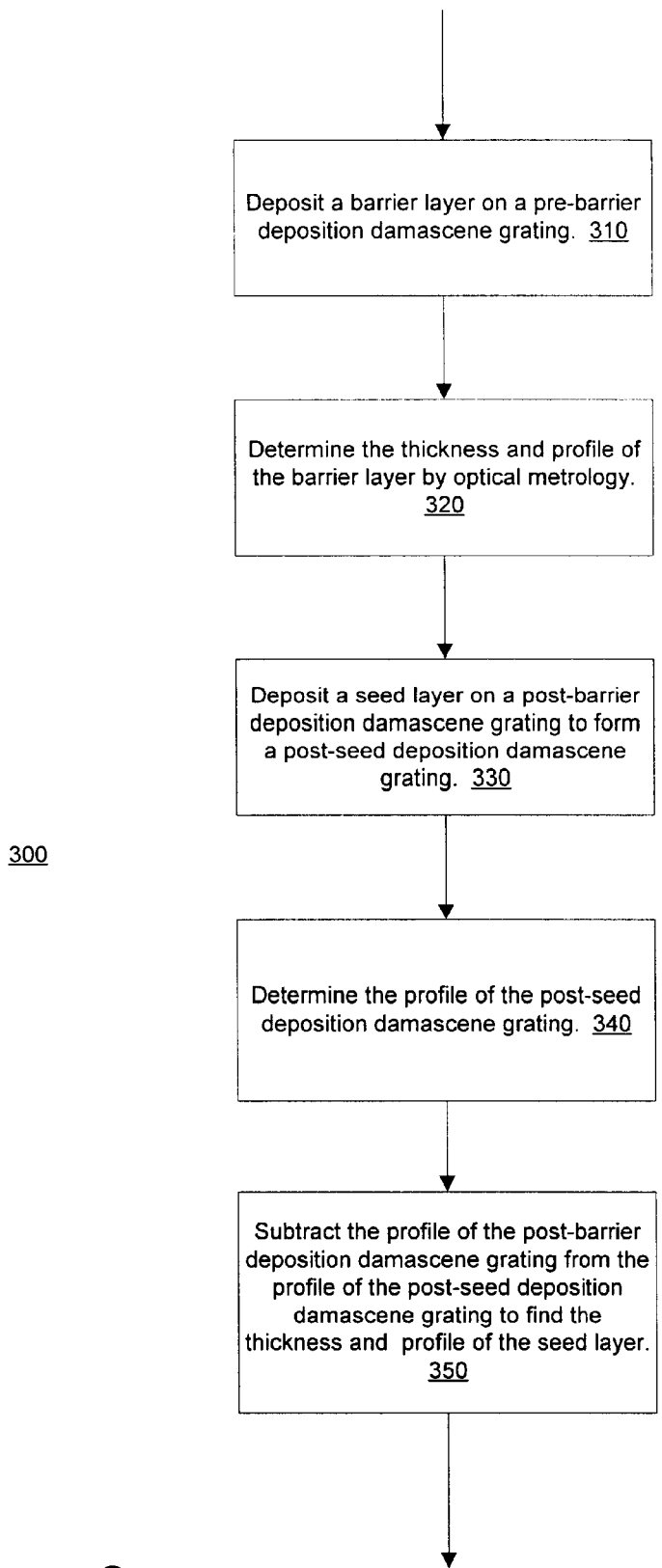
FIG. 3 is a flow chart shown outlining steps for separately measuring a barrier layer and a seed layer for metal electroplating in accordance with one embodiment of the invention.
Figure 4:
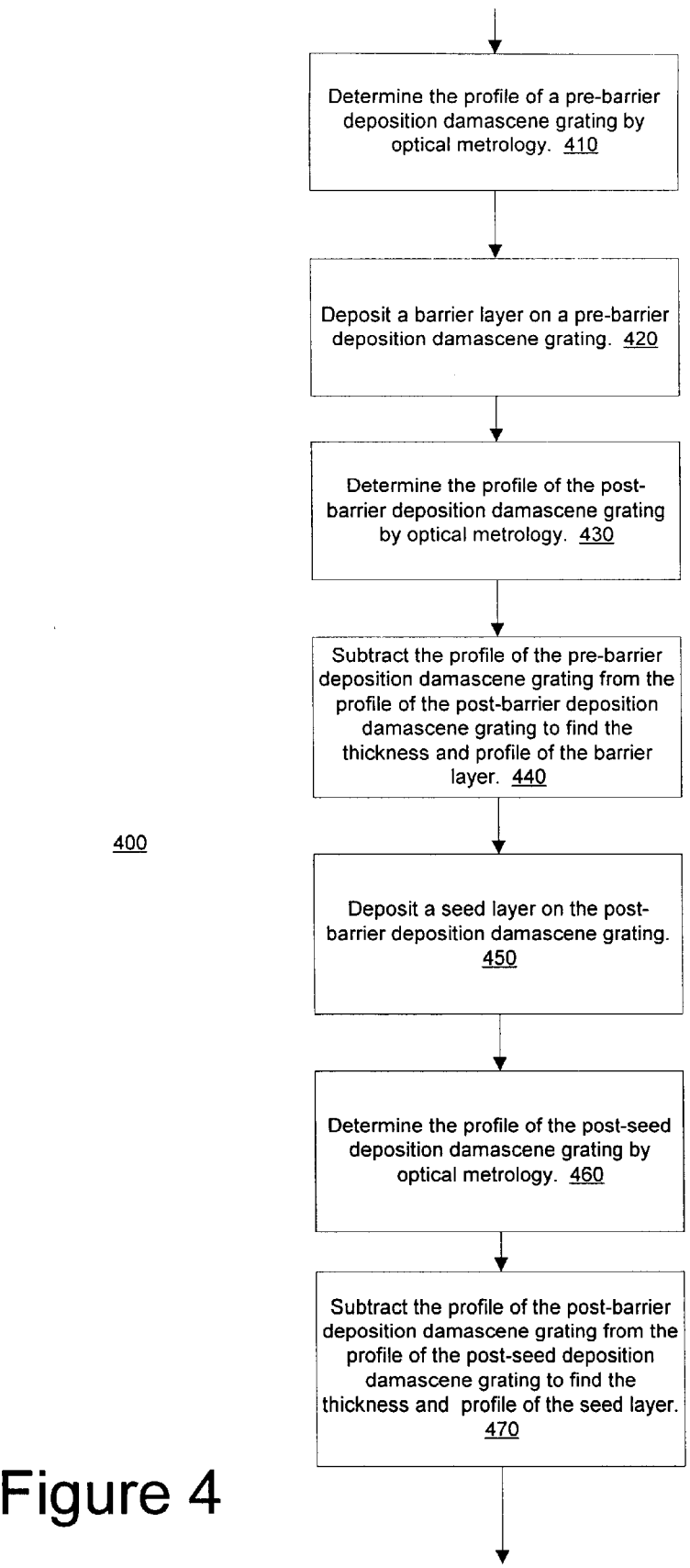
FIG. 4 is a flow chart shown outlining steps for separately measuring a barrier layer and a seed layer for metal electroplating in accordance with one embodiment

Referring now to FIG. 3, a flow chart 300 is shown outlining steps for separately measuring a barrier layer and a seed layer for metal electroplating in accordance with one embodiment of the invention. Specifically, a direct non-destructive measuring method of optical metrology is performed for the barrier layer, while a subtractive measuring method is performed for the seed layer.

In step 310, the barrier layer is deposited on a pre-barrier deposition damascene grating, thereby resulting in a post-barrier deposition damascene grating.

In step 320, the thickness and profile of the barrier layer is determined non-destructively by optical metrology. The barrier layer is relatively thin and transparent to certain wavelengths. Using optical metrology, a measurement of the barrier layer on the damascene grating can be made directly and non-destructively to determine the barrier thickness and profile. As understood herein, step 320 need not be performed for every single processing flow. For example, in another embodiment, the thickness of the barrier assumed to be consistent with past measured thickness.

In step 330, the seed layer is deposited on the post-barrier damascene grating, resulting in a post-seed deposition damascene grating.

In step 340, the profile of the post-seed deposition damascene grating is determined non-destructively using optical metrology.

In step 350, the thickness and profile of the seed layer is determined-by substracting the profile of the post-barrier damascene grating from the profile of the post-seed deposition damascene grating.

Referring now to FIG. 4, a flow chart 400 is shown outlining steps for separately measuring a barrier layer and a seed layer for metal electroplating in accordance with one embodiment of the invention. Specifically, the subtractive method can be used for the barrier layer as well as for the seed layer.

In step 410, the profile of the pre-barrier deposition damascene grating is determined non-destructively using optical metrology.

In step 420, the barrier layer is deposited on the pre-barrier deposition damascene grating, thereby resulting in a post-barrier deposition damascene grating.

In step 430, the profile of the post-barrier deposition damascene grating is determined using optical metrology.

In step 440, the thickness and profile of the barrier layer is determined by subtrating the profile of the pre-barrier damascene grating from the profile of the post-barrier damascene grating. As understood herein, step 440 need not be performed for every single processing flow. For example, in another embodiment, the thickness of the barrier layer is assumed to be consistent with past measured thickness.

In step 450, a seed layer is deposited on the post-barrier damascene grating, thereby resulting in a post-seed deposition damascene grating.

In step 460, the profile of the post-seed deposition damascene grating is determined non-destructively using optical metrology.

In step 470, the thickness and profile of the seed layer is determined by subtracting the profile of the post-barrier damascene grating from the profile of the post-seed deposition damascene grating.

Figure 5:
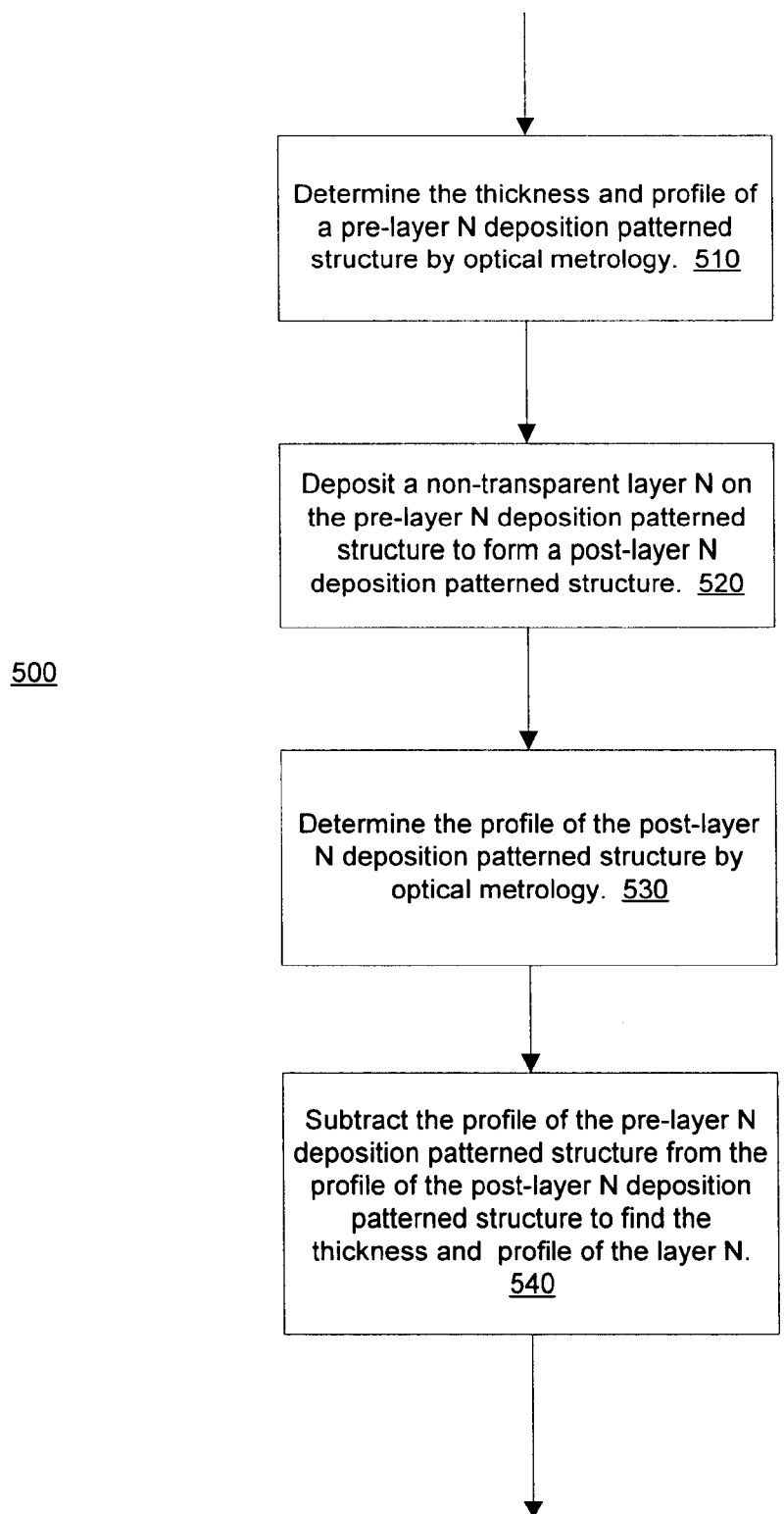
FIG. 5 is a flow chart shown outlining steps for determining the thickness and profile of a non-transparent layer in accordance with one embodiment of the invention.

Referring now to FIG. 5, a flow chart 500 is shown outlining steps for determining the thickness and profile of a non-transparent layer in accordance with one embodiment of the invention. The non-transparent layer is understood to be a layer whose profile can be determined using optical metrology, but whose thickness cannot be determined using optical metrology. In other words, flow chart 500 can be thought of as a measuring method generalized for measuring the thickness of a layer that is non-transparent to optical metrology, wherein this non-transparent layer need not be the seed layer described above. Moreover, this non-transparent layer could be the n-th layer of a patterned structure, wherein the patterned structure need not be a damascene structure for metal electroplating. For example, the patterned structure can be a damascene structure for tungsten deposition.

Specifically, in step 510, before the deposition of a n-th layer N, the profile of a pre-layer N deposition patterned structure is measured non-destructively using optical metrology.

In step 520, a non-transparent layer N is deposited on the pre-layer N deposition patterned structure, thereby resulting in a post-layer N deposition patterned structure.

In step 530, the profile of the post-layer N deposition patterned structure is determined non-destructively using optical metrology.

In step 540, the thickness and profile of the layer N is determined by subtracting the profile of the pre-layer N deposition patterned structure from the profile of the post-layer N deposition patterned structure.

As understood herein, the above methods can be performed with a system that has optical metrology capability. In view of FIG. 5, this system can determine the thickness and profile of a n-th layer N on a patterned structure wherein the layer N is non-transparent to optical metrology.

The system comprises an optical metrology unit and a subtraction unit. The optical metrology unit is adapted for measuring the profile of a pre-layer N deposition patterned structure non-destructively using optical metrology. Furthermore, the optical metrology unit is adapted for measuring the profile of said post-layer N deposition patterned structure non-destructively using optical metrology, wherein said non-transparent layer N is deposited on the pre-layer N deposition patterned structure to form the post-layer N deposition patterned structure. The subtraction unit is adapted for determining the thickness and profile of the layer N by subtracting the profile of the pre-layer N deposition patterned structure from the profile of the post-layer N deposition patterned structure.

As understood herein, the post-layer N deposition patterned structure can be a damascene structure for metal electroplating such as copper electroplating. The post-layer N deposition patterned structure can also be for tungsten deposition.

As understood herein, the advance of integrated metrology allows all of the above measuring methods to be made on the process system rather than a stand-alone ellipsometer or reflectometer. In this case, there would not need to be a vacuum-break between the barrier and seed deposition.

Moreover, optical metrology allows rapid, non-destructive measurement of damascene metal layer thickness and profile. These measurements can be done quickly for each site (several seconds). In addition, multiple sites can be measured, allowing process control.

The foregoing descriptions of specific embodiments of the invention have been presented for purposes of illustration and description. They are not intended to be exhaustive or to limit the invention to the precise forms disclosed. Obviously, many modifications and variations are possible in light of the above teaching. The embodiments were chosen and described in order to explain the principles and the application of the invention, thereby enabling others skilled in the art to utilize the invention in its various embodiments and modifications according to the particular purpose contemplated. The scope of the invention is intended to be defined by the claims appended hereto and their equivalents.

What is claimed is:

1. A method for determining the thickness and profile of a composite metal layer comprising a barrier layer and a seed layer for metal electroplating, said method comprising the steps of:
   a) measuring the profile of a pre-composite metal deposition damascene grating non-destructively using optical metrology;
   b) measuring the profile of a post-composite metal deposition damascene grating non-destructively using optical metrology, said post-composite metal deposition damascene grating formed by depositing said composite metal layer on said pre-composite metal deposition damascene grating;
   c) determining the total thickness and profile of said composite metal layer by subtracting the profile of said pre-composite metal deposition damascene grating from profile of said post-composite metal deposition damascene grating.

2. The method of claim 1, wherein said barrier and seed layers are measured with optical metrology in the same process system rather than measured using a standalone ellipsometer or reflectometer.

3. The method of claim 1, wherein said barrier and seed layers are deposited without a vacuum-break between the barrier deposition and seed deposition.

4. The method of claim 1, wherein said optical metrology can be done for each site in several seconds, and wherein multiple sites can be measured by optical metrology, thereby allowing statistical process control.

5. A method for determining the thickness and profile of a barrier layer and a seed layer for metal electroplating, said method comprising the steps of:
   a) measuring the thickness and profile of said barrier layer non-destructively by optical metrology, wherein said barrier layer is deposited on a pre-barrier deposition damascene grating to form a post-barrier deposition damascene grating;
   b) measuring the profile of a post-seed deposition damascene grating non-destructively using optical metrology, wherein said seed layer is deposited on said post-barrier deposition damascene grating to form said post-seed deposition damascene grating; and
   c) determining the thickness and profile of said seed layer by subtracting the profile of said post-barrier damascene grating from the profile of said post-seed deposition damascene grating.

6. The method of claim 5, wherein said barrier and seed layers are measured with optical metrology in the same process system rather than measured using a standalone ellipsometer or reflectometer.

7. The method of claim 5, wherein said barrier and seed layers are deposited without a vacuum-break between the barrier deposition and seed deposition.

8. The method of claim 5, wherein said optical metrology can be done for each site in several seconds, and wherein multiple sites can be measured by optical metrology, thereby allowing statistical process control.

9. The method of claim 5, wherein, said step c) need not be performed for every single processing flow, and wherein the thickness of said barrier layer is assumed to be consistent with past measured thickness.

10. A method for determining the thickness and profile of a barrier layer and a seed layer for metal electroplating, said method comprising the steps of:
   a) measuring the profile of a pre-barrier deposition damascene grating non-destructively using optical metrology;
   b) measuring the profile of said post-barrier deposition damascene grating non-destructively using optical metrology, wherein said barrier layer is deposited on said pre-barrier deposition damascene grating to form said post-barrier deposition damascene grating;
   c) determining the thickness and profile of said barrier layer by subtracting the profile of said pre-barrier damascene grating from the profile of said post-barrier damascene grating;

d) measuring the profile of said post-seed deposition damascene grating non-destructively using optical metrology, wherein said seed layer is deposited on said post-barrier grating to form said post-seed deposition damascene grating; and e) determining the thickness and profile of said seed layer by subtracting the profile of said post-barrier damascene grating from the profile of said post-seed deposition damascene grating.

11. The method of claim 10, wherein said barrier and seed layers are measured with optical metrology in the same process system rather than measured using a stand-alone ellipsometer or reflectometer.

12. The method of claim 10, wherein said barrier and seed layers are deposited without a vacuum-break between the barrier deposition and seed deposition.

13. The method of claim 10, wherein said optical metrology can be done for each site in several seconds, and wherein multiple sites can be measured by optical metrology, thereby allowing statistical process control.

14. The method of claim 10, wherein said step c) need not be performed for every single processing flow, and wherein the thickness of said barrier layer is assumed to be consistent with past measured thickness.

15. A method for determining the thickness and profile of a n-th layer N on a post-layer N deposition patterned structure wherein said layer N is non-transparent to optical metrology, said method comprising the steps of:

a) measuring the profile of a pre-layer N deposition patterned structure non-destructively using optical metrology;

b) measuring the profile of said post-layer N deposition patterned structure non-destructively using optical metrology, wherein said non-transparent layer N is deposited on said pre-layer N deposition patterned structure to form said post-layer N deposition patterned structure; and c) determining the thickness and profile of said layer N by subtracting the profile of said pre-layer N deposition patterned structure from the profile of said post-layer N deposition patterned structure.

16. The method of claim 15, wherein said post-layer N deposition patterned structure is a damascene structure for metal electroplating.

17. The method of claim 15, wherein said post-layer N deposition patterned structure is a damascene structure is for tungsten deposition.

18. A system for determining the thickness and profile of a n-th layer N on a post-layer N deposition patterned structure wherein said layer N is non-transparent to optical metrology, said system comprising:

an optical metrology unit adapted for measuring the profile of a pre-layer N deposition patterned structure non-destructively using optical metrology, said optical metrology unit also adapted for measuring the profile of said post-layer N deposition patterned structure non-destructively using optical metrology, wherein said non-transparent layer N is deposited on said pre-layer N deposition patterned structure to form said post-layer N deposition patterned structure; and subtraction unit adapted for determining the thickness and profile of said layer N by subtracting the profile of said pre-layer N deposition patterned structure from the profile of said post-layer N deposition patterned structure.

19. The system of claim 18, wherein said post-layer N deposition patterned structure is a damascene structure is for metal electroplating.

20. The system of claim 18, wherein said post-layer N deposition patterned structure is a damascene structure is for tungsten deposition.

21. The system of claim 18, wherein said barrier and seed layers are deposited without a vacuum-break between the barrier deposition and seed deposition.

22. The system of claim 18, wherein said optical metrology unit is adapted to measure multiple sites, thereby allowing statistical process control.

23. A computer readable storage medium containing computer executable code for determining the thickness and profile of a composite metal layer comprising a barrier layer and a seed layer for metal electroplating by instructing a computer to operate as follows:

a) measure the profile of a pre-composite metal deposition damascene grating non-destructively using optical metrology;

b) measure the profile of a post-composite metal deposition damascene grating non-destructively using optical metrology, said post-composite metal deposition damascene grating formed by depositing said composite metal layer on said pre-composite metal deposition damascene grating;

c) determine the total thickness and profile of said composite metal layer by subtracting the profile of said pre-composite metal deposition damascene grating from profile of said post-composite metal deposition damascene grating.

24. The computer readable storage medium of claim 23, wherein said barrier and seed layers are measured with optical metrology in the same process system rather than measured using a stand-alone ellipsometer or reflectometer.

25. The computer readable storage medium of claim 23, wherein said barrier and seed layers are deposited without a vacuum-break between the barrier deposition and seed deposition.

26. The computer readable storage medium of claim 23, wherein said optical metrology can be done for each site in several seconds, and wherein multiple sites can be measured by optical metrology, thereby allowing statistical process control.

27. A computer readable storage medium containing computer executable code for determining the thickness and profile of a n-th layer N on a post-layer N deposition patterned structure wherein said layer N is non-transparent to optical metrology by instructing a computer to operate as follows:

a) measure the profile of a pre-layer N deposition patterned structure non-destructively using optical metrology;

b) measure the profile of said post-layer N deposition patterned structure non-destructively using optical metrology, wherein said non-transparent layer N is deposited on said pre-layer N deposition patterned structure to form said post-layer N deposition patterned structure; and c) determine the thickness and profile of said layer N by subtracting the profile of said pre-layer N deposition patterned structure from the profile of said post-layer N deposition patterned structure.

28. The computer readable storage medium of claim 27, wherein said post-layer N deposition patterned structure is a damascene structure for metal electroplating.

29. The computer readable storage medium of claim 27, wherein said post-layer N deposition patterned structure is a damascene structure for tungsten deposition.

* * * * *